(12) United States Patent
Oh et al.

(10) Patent No.: US 8,180,709 B2
(45) Date of Patent: May 15, 2012

(54) METHOD AND DEVICE FOR CONSUMING RIGHTS OBJECTS HAVING INHERITANCE STRUCTURE IN ENVIRONMENT WHERE THE RIGHTS OBJECTS ARE DISTRIBUTED OVER PLURALITY OF DEVICES

(75) Inventors: Yun-sang Oh, Seoul (KR); Suk-bong Lee, Suwon-si (KR); Kyung-im Jung, Seongnam-si (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 1326 days.

(21) Appl. No.: 11/331,091

(22) Filed: Jan. 13, 2006

(65) Prior Publication Data
US 2006/0155650 A1    Jul. 13, 2006

Related U.S. Application Data

(60) Provisional application No. 60/643,150, filed on Jan. 13, 2005.

(30) Foreign Application Priority Data

Nov. 23, 2005 (KR) .................... 10-2005-0112553

(51) Int. Cl.
G06F 21/00 (2006.01)
G06Q 20/00 (2012.01)
(52) U.S. Cl. .......................................... 705/57; 705/67
(58) Field of Classification Search ............... 705/50–79
See application file for complete search history.

(56) References Cited

U.S. PATENT DOCUMENTS

| 6,230,247 | B1 | 5/2001 | Cannon et al. |
| 6,412,070 | B1* | 6/2002 | Van Dyke et al. ............... 726/17 |
| 6,654,754 | B1 | 11/2003 | Knauft et al. |
| 2003/0126086 | A1 | 7/2003 | Safadi |

(Continued)

FOREIGN PATENT DOCUMENTS

CN    1536529 A    10/2004

(Continued)

OTHER PUBLICATIONS

Japanese Office Action issued on Oct. 19, 2010 in the corresponding Japanese Patent Application No. 2007-550309.

Primary Examiner — Evens J Augustin
Assistant Examiner — Thomas West
(74) Attorney, Agent, or Firm — Muir Patent Consulting, PLLC

(57) ABSTRACT

A digital rights management method and device are provided. To implement the DRM method and device, there is provided a master device including a storage module which stores a plurality of rights objects (ROs) having an inheritance structure, a detection module which detects the storage module for an RO needed for playing back a predetermined content object, a message generation module which, if the detection module fails to discover the RO needed for playing back the predetermined content object from the storage module, generates an RO request message, a device interface module which transmits the RO request message to a slave device and receives the RO needed for playing back the predetermined content object from the slave device, and a playback module which plays back the predetermined content object using at least one of the RO detected from the storage module and the RO received from the slave device.

20 Claims, 11 Drawing Sheets

U.S. PATENT DOCUMENTS

| | | |
|---|---|---|
| 2004/0236697 A1 | 11/2004 | Nagao |
| 2005/0243355 A1* | 11/2005 | Foehr et al. .................. 358/1.13 |
| 2007/0079381 A1* | 4/2007 | Hartung et al. ................. 726/26 |
| 2008/0256368 A1* | 10/2008 | Ross et al. .................... 713/193 |

FOREIGN PATENT DOCUMENTS

| | | |
|---|---|---|
| CN | 1537270 A | 10/2004 |
| JP | 2002-358241 A | 12/2002 |
| JP | 2004-220546 A | 8/2004 |
| JP | 2004-295271 A | 10/2004 |
| JP | 2004-348286 A | 12/2004 |
| KR | 10-2003-44892 A | 6/2003 |
| KR | 10-2005-0039523 A | 4/2005 |
| KR | 10-2006-0011760 A | 2/2006 |

* cited by examiner

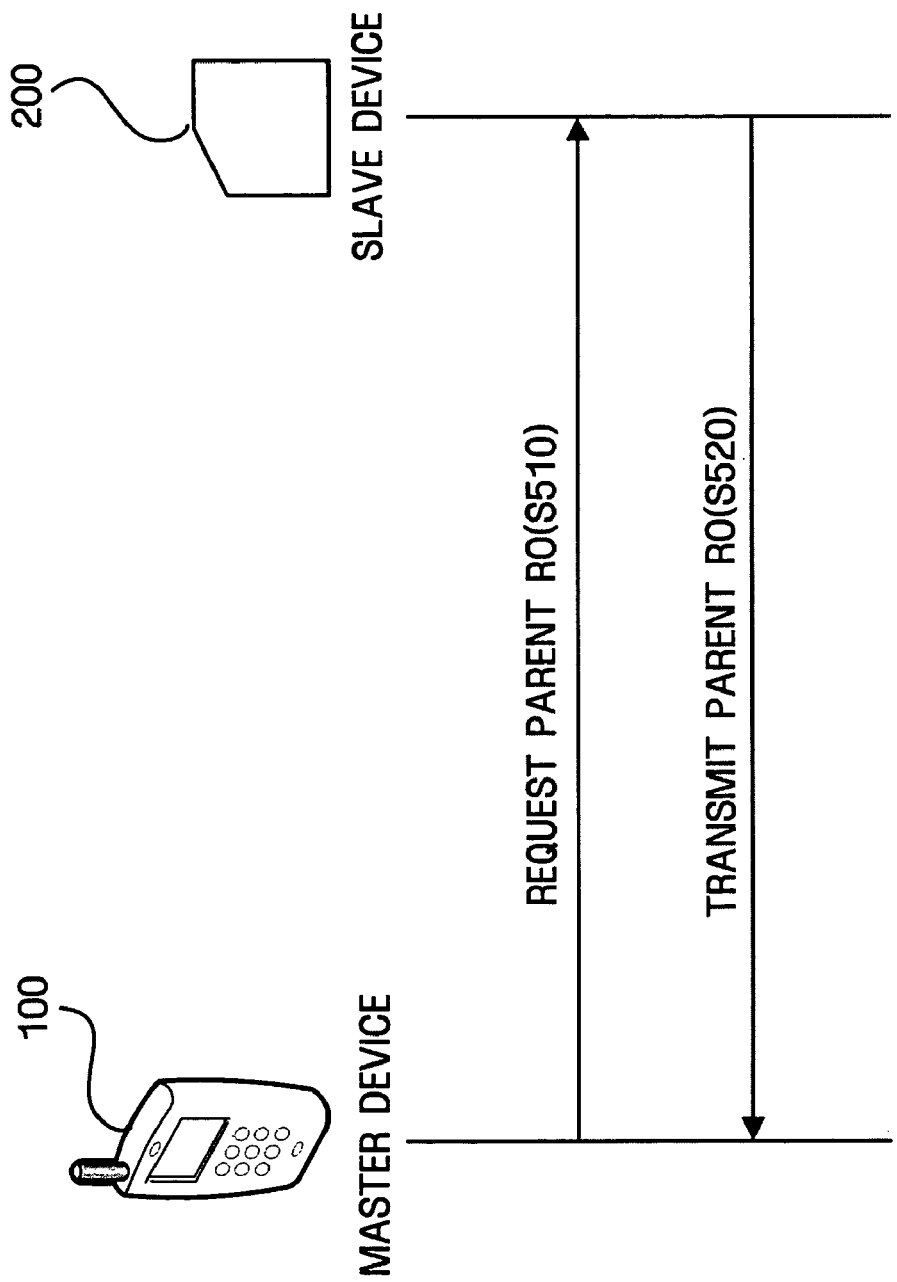

FIG. 6

```
<o-ex:rights
  xmlns:o-ex="http://odrl.net/1.1/ODRL-EX"
  xmlns:o-dd="http://odrl.net/1.1/ODRL-DD"
  xmlns:oma-dd="http://www.openmobilealliance.com/oma-dd"
  xmlns:ds="http://www.w3.org/2000/09/xmldsig#"
  xmlns:xenc="http://www.w3.org/2001/04/xmlenc#">
  <o-ex:context>
    <o-dd:version>2.0</o-dd:version>
    <o-dd:uid>RightsObjectID</o-dd:uid>
  </o-ex:context>
  <o-ex:agreement>
    <o-ex:asset>
      <o-ex:context>                         610
        <o-dd:uid>SubscriptionGUID</o-dd:uid>
      </o-ex:context>
    </o-ex:asset>
    <o-ex:permission>
      <o-dd:play>
        <o-ex:constraint>
          <o-dd:datetime>
            <o-dd:end>2004-04-30T23:59:59Z</o-dd:end>
          </o-dd:datetime>
        </o-ex:constraint>
      </o-dd:play>
    </o-ex:permission>
  </o-ex:agreement>
</o-ex:rights>
```

```
<o-ex:rights
 xmlns:o-ex="http://odrl.net/1.1/ODRL-EX"
 xmlns:o-dd="http://odrl.net/1.1/ODRL-DD"
 xmlns:oma-dd="http://www.openmobilealliance.com/oma-dd"
 xmlns:ds="http://www.w3.org/2000/09/xmldsig#"
 xmlns:xenc="http://www.w3.org/2001/04/xmlenc#">
 <o-ex:context>
  <o-dd:version>2.0</o-dd:version>
  <o-dd:uid>RightsObjectID</o-dd:uid>
 </o-ex:context>
 <o-ex:agreement>
  <o-ex:asset>                    730
   <o-ex:context>
    <o-dd:uid>ContentID</o-dd:uid>
   </o-ex:context>
                                  710
   <o-ex:inherit>
    <o-ex:context>
     <o-dd:uid>SubscriptionGUID</o-dd:uid>
    </o-ex:context>
   </o-ex:inherit>
   <o-ex:digest>
    <ds:DigestMethod ds:Algorithm="http://www.w3.org/2000/09/xmldsig#sha1"/>
    <ds:DigestValue>DCFHash</ds:DigestValue>
   </o-ex:digest>
   <ds:KeyInfo>
    <xenc:EncryptedKey>
     <xenc:EncryptionMethod Algorithm="http://www.w3.org/2001/04/xmlenc#kw-aes128"/>
     <xenc:CipherData>
      <xenc:CipherValue>EncryptedCEK</xenc:CipherValue>
     </xenc:CipherData>
    </xenc:EncryptedKey>            720
    <ds:RetrievalMethod URI="REKReference"/>
   </ds:KeyInfo>
  </o-ex:asset>
 </o-ex:agreement>
</o-ex:rights>
```

METHOD AND DEVICE FOR CONSUMING RIGHTS OBJECTS HAVING INHERITANCE STRUCTURE IN ENVIRONMENT WHERE THE RIGHTS OBJECTS ARE DISTRIBUTED OVER PLURALITY OF DEVICES

CROSS-REFERENCE TO RELATED APPLICATIONS

This application claims priority from Korean Patent Application No. 10-2005-0112553 filed on Nov. 23, 2005, in the Korean Intellectual Property Office, and U.S. Provisional Patent Application No. 60/643,150 filed on Jan. 13, 2005, in the United States Patent and Trademark Office, the disclosures of which are incorporated herein by reference in their entirety.

BACKGROUND OF THE INVENTION

1. Field of the Invention

Methods and apparatuses consistent with the present invention relate to digital rights management, and more particularly, to consuming a rights object (RO) having an inheritance structure in an environment where the RO is distributed over a plurality of devices.

2. Description of the Related Art

Recently, digital rights management (hereafter, referred to as DRM) has been actively researched and developed. Commercial services using DRM have already been used or will be used. DRM needs to be used because of the following various characteristics of digital content; digital content can be copied and easily distributed.

There were several efforts to protect digital content. Conventionally, digital content protection has been concentrated on preventing non-permitted access to digital content, permitting only people who paid charges to access the digital content. Thus, people who paid charges to the digital content are allowed to unencrypted digital content while people who did not pay charges are not allowed to. In this case, when a person paid charges intentionally distributes the digital content to other people, however, the people can use the digital content without paying charges.

To solve this program, DRM was introduced. In DRM, any one is allowed to freely access encoded digital content, but a license referred to as an RO is needed to decode and execute the digital content.

Referring to FIG. 1, a device 10 obtains digital content from a content provider 20. Digital content provided by the content provider 20 is encrypted, and thus, in order to use the digital content, an RO corresponding to the digital content is needed.

The device 10 can obtain the RO with a license to play the encrypted content from received from an RO issuer 30. To this end, a user should pay charges. The encrypted digital content is decrypted using a key contained in the RO.

The RO issuer 30 makes the content provider 20 prepare an RO issuing detail report. The RO issuer 30 and the content provider 20 may be the same authority.

After obtaining the RO, the device 10 consumes the RO to use the encrypted digital content.

The encrypted digital content can be freely copied and distributed to another device (not shown). However, since an RO contains constraint information such as Count, Interval or Copy, unlike the encrypted digital content, the RO has a limitation in its reuse or replication. Accordingly, the digital content can be more effectively protected by using DRM.

Recent DRM techniques enable content object playback services to be provided to users on a subscription basis by playing back content objects using a plurality of ROs having an inheritance structure. A device generally needs two or more ROs that are in inheritance relationship to use an encrypted content object. A plurality of ROs needed for using a single encrypted content object may be stored in different devices. Therefore, it is necessary to develop methods to efficiently consume a plurality of ROs needed for using a single encrypted content object.

Recently, methods for facilitating the storage and distribution of ROs by managing the ROs with the aid of a portable storage device such as a memory stick or a multimedia card have been developed. However, portable storage devices generally provide poorer operation capabilities than digital content playback devices. Therefore, it is necessary to develop methods to reduce the operation load of a portable storage device when a device consumes a plurality of ROs that are stored in the portable storage device and have an inheritance structure.

SUMMARY OF THE INVENTION

The present invention provides a method and device for enabling a plurality of ROs distributed over a plurality of devices to be efficiently consumed.

According to an aspect of the present invention, there is provided a master device including a storage module which stores a plurality of ROs having an inheritance structure, a detection module which searches the storage module for an RO needed for playing back a predetermined content object, a message generation module which, if the detection module fails to discover the RO needed for playing back the predetermined content object from the storage module, generates an RO request message, a device interface module which transmits the RO request message to a slave device and receives the RO needed for playing back the predetermined content object from the slave device, and a playback module which plays back the predetermined content object using at least one of the RO detected from the storage module and the RO received from the slave device.

According to another aspect of the present invention, there is provided a method of consuming a plurality of ROs including obtaining a plurality of ROs having a predetermined inheritance structure from a slave device, and playing back a predetermined content object using the ROs.

BRIEF DESCRIPTION OF THE DRAWINGS

The above and other aspects of the present invention will become more apparent by describing in detail exemplary embodiments thereof with reference to the attached drawings in which:

FIG. 5 is a flowchart illustrating a method of obtaining a parent RO according to an exemplary embodiment of the present invention;

FIG. 6 is a diagram of a parent RO according to an exemplary embodiment of the present invention;

FIG. 7 is a diagram of a child RO according to an exemplary embodiment of the present invention;

DETAILED DESCRIPTION OF EXEMPLARY EMBODIMENTS OF THE INVENTION

Figure 1:
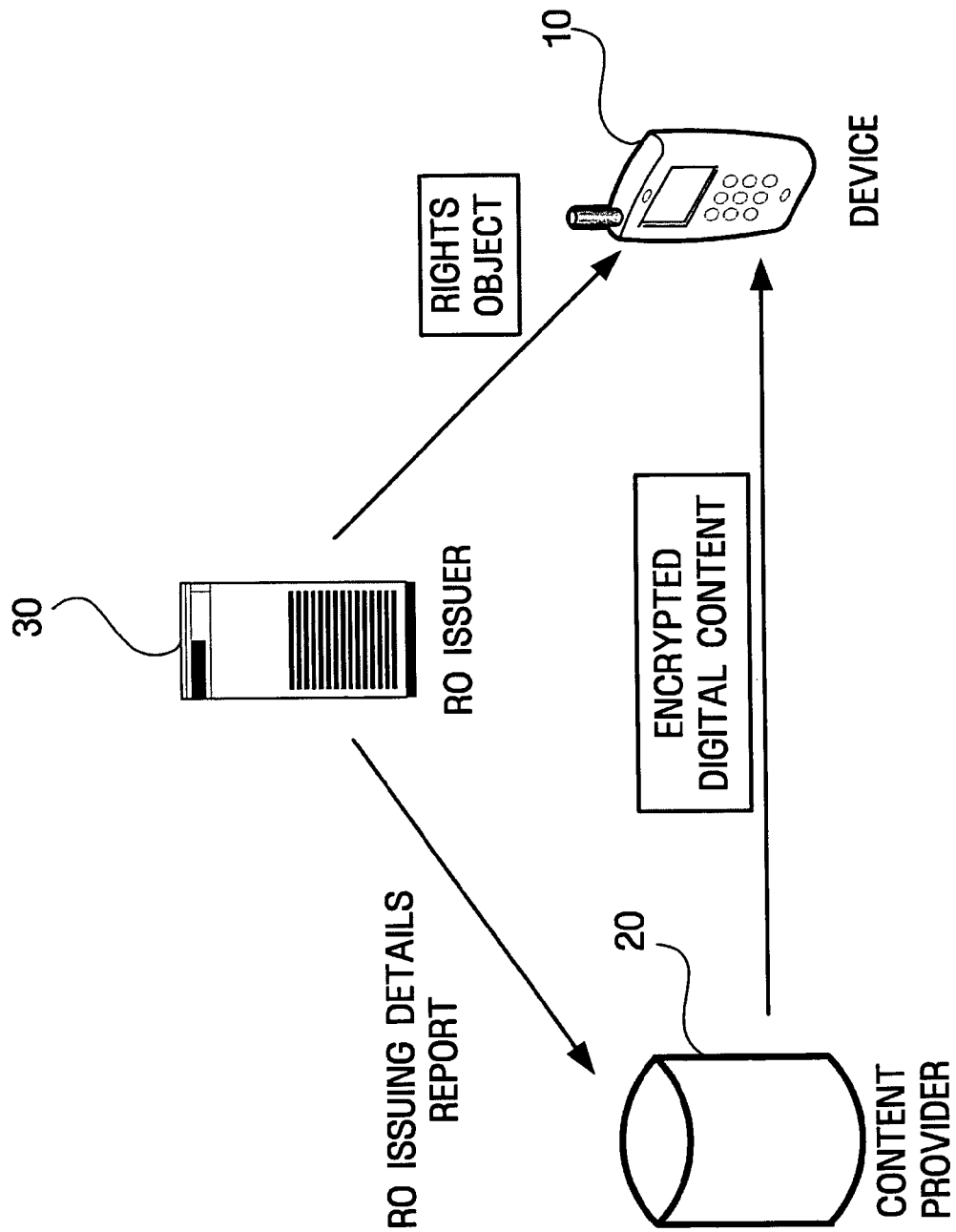
FIG. 1 is a diagram of a typical DRM system.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Several terms used herein will first be described in a brief manner for better understanding of the present description. Thus, it should be noted that this description will not be interpreted to limit the protection scope of the present invention as long as there is no express limitation on them.

Master Device

A master device is a device which can be connected to a slave device and can play back a content object using a plurality of ROs having a reciprocal inheritance structure. The master device may be a portable content playback device such as a mobile phone, a personal digital assistant (PDA), or an MP3 player or a non-portable content playback device such as a desktop computer or a digital TV.

Slave Device

A slave device is a storage device including a non-volatile memory such as a flash memory to/from which data can be written/read, has predetermined data operation capabilities, and can be easily connected to/disconnected from a master device. The slave device may be a portable storage device such as a smart media card, a memory stick, a CF card, an XD card, or a multimedia card. However, the slave device may be a device other than those set forth herein or may be a device of a similar type to that of a master device.

Content Objects

Content objects are encrypted digital content. Here, digital content may be a moving picture, a still picture, audio data, a game, or text data.

ROs

ROs are licenses for using content objects. ROs comprise at least one of a content encryption key, constraint information, and permission information. In the present invention, ROs are classified into parent ROs and child ROs. Parent ROs have an inheritance relationship with respective corresponding child ROs. Parent ROs comprise at least one of constraint information and permission information, while child ROs comprise content object identifiers and content encryption keys. For a better understanding of the present invention, it will now be assumed that child ROs, instead of parent ROs, comprise constraint information, but the present invention is not restricted to it. Therefore, entire constraint information or part of the constraint information may be included in child ROs. The functions of constraint information included in child ROs can be fully understood by understanding the functions of constraint information included in parent ROs. Each parent ROs and its corresponding child ROs have the same inheritance relationship identifiers so that the inheritance relationships between the parent RO and the corresponding child ROs can be identified by the inheritance relationship identifiers. A single parent RO may have an inheritance relationship with a plurality of child ROs. Also, a single child RO may have an inheritance relationship with a plurality of parent ROs.

Content Encryption Keys

Content encryption keys are keys used for decrypting content objects and have predetermined binary values. Content encryption keys are included in child ROs, and child ROs comprise content object identifiers identifying content objects that can be decrypted using content encryption keys included in the child ROs.

Permission Information

Permission information indicates play-back and reproduction types of a content object.

Example of the play back include "Play", "Display", "Execute", and "Print". The Play component indicates a right to express content in an audio/video format. In addition, the Display component indicates a right to display a content object through a visual device, and the Print component indicates a right to generate a hard copy of a content object. For example, in a case where the content object is a moving picture or music, at least one of the display component and print component may be set as permission information of an RO to be consumed to play the content object. The Execute component indicates a right to execute a content object such as games and other application programs. For example, in a case where the content object is a JAVA game, the Execute component may be set as permission information of an RO to be consumed to play the JAVA game.

Meanwhile, examples of the duplication include the Copy component and the Move component. The copy component and the move component are rights to move an RO from one device to another device and to store the same. The Move component deactivates the original RO in the current device, while the Copy component does not deactivate the original RO in the current device. Here, deactivation may mean deletion of an RO.

Constraint Information

Constraint information refers to constraints allowing an RO to be played back and one or more pieces of constraint information may be set. Examples of the constraint information include Count constraint, Datetime constraint, Interval constraint, Accumulated constraint, and so on.

Here, the Count constraint specifies the count of permissions granted to a content object. When the count constraint is set to 10, the master device is allowed to play the content object 10 times until the count constraint for the RO is consumed.

The Datetime constraint specifies duration for permission and selectively contains a start element or an end element. When an RO with a Datetime constraint set is consumed, the master device can play a content object after and before a time/date specified by a start item of the datetime constraint. For example, when the start item is set to 00:00:00 (hour:minute:second) 2005-12-01 (year-month-day), the master device cannot access to and consume the RO for play the content object before 00:00:00 2005-12-08.

The Interval constraint specifies a time interval at which an RO can be executed for the corresponding content object. When a start element is contained in the Interval constraint, consumption of the content object is permitted during a period of time specified by a duration element contained in the Interval constraint after a specified time/date. For example, let the interval constraint of be one week. When the master device consumes an RO on and after 00:00:00 2005-12-01 to play a content object, consumption of the RO for playing the content object is permitted by 00:00:00 2005-12-08.

The Accumulated constraint specifies a maximum time interval for an accumulated measured period of time while the RO is executed for the corresponding content object. When an RO has the accumulated constraint set to 10, the master device can play a content object for 10 hours. In this instance, the master device is not limited by the Count or Datetime.

Public-Key Cryptography

This is also referred to as asymmetric cryptography because encryption is made when a key used in decrypting data and a key used in encrypting the data constitute different encryption keys. In public-key cryptography, an encryption key consists of a pair of a public key and a private key. The public key is not necessary to be kept in secret, i.e., the public is easily accessible thereto while the private key must be known only to a specific device. This public key encryption algorithm has been disclosed to the general public but a third person cannot know or hardly know the original content with encryption algorithm, encryption key and ciphered text. There are examples of public key encryption algorithm such as Diffie-Hellman, RSA, El Gamal, Elliptic Curve, etc.

Symmetric-Key Cryptography

This is also referred to as secret key cryptography, wherein encryption is made when a key used to encrypt data and a key used to decrypt the data constitute the same encryption key. As an example of such symmetric key encryption, data encryption standard (DES) method is used most generally, but application adopting advanced encryption standard (AES) method has recently been increased.

Random Number

A random number is a sequence of numbers or characters with random properties. Since it costs a lot to generate a complete random number, a pseudo-random number may be used.

Connection

When a master device is connected with a slave device in the present invention, they are electrically connected with each other via each wired medium. However, this is just an example, and "being connected" simply implies that two devices can communicate with each other through a wireless medium in a non-contact state.

Terms specifically defined above will be described below when necessary.

Figure 2:
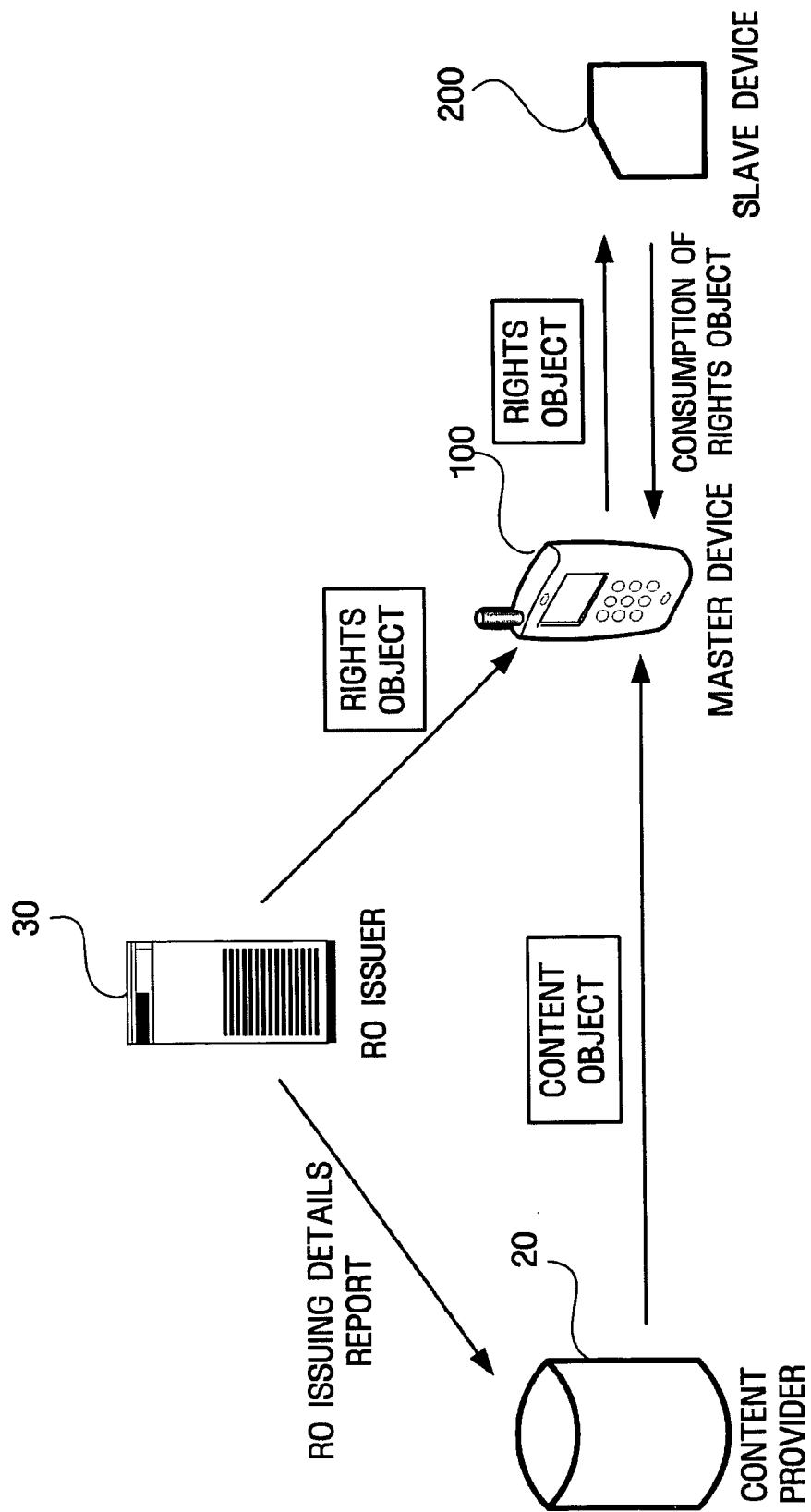
FIG. 2 is a diagram of a DRM system according to an exemplary embodiment of the present invention.

FIG. 2 is a diagram of a DRM system according to an exemplary embodiment of the present invention.

Referring to FIG. 2, the DRM system includes a master device 100 and a slave device 200.

A user can obtain content objects from a content provider 20 via the master deice 100 in the same manner as in a conventional typical DRM system. In addition, the user can purchase ROs needed for playing back content objects from an RO issuer 30. The purchased ROs may be stored in the master device 100 and then moved to/copied to the slave device 200. The slave device 200 may be equipped with one or more ROs when manufacturing the slave device 200.

If the slave device 200 stores ROs, the master device 100 may play back content objects by being connected to the salve device 200 and consuming the ROs stored in the slave device 200. In order to play back a content object, the master device 100 may use a plurality of ROs having an inheritance structure. Here, the ROs having an inheritance structure may comprise at least one parent RO and at least one child RO. For convenience, it will now be assumed that a content object is played back by consuming a parent RO and a child RO having an inheritance relationship, but the present invention is not restricted to it.

The master device 100 and the slave device 200 may authenticate each other before being connected to each other and exchanging data with each other. The authentication between the master device 100 and the slave device 200 is carried out for determining whether the master device 100 and the slave device 200 are legitimate and maintaining the security of data transmitted between the master device 100 and the slave device 200. This will now be described in detail with reference to FIG. 3.

Figure 3:
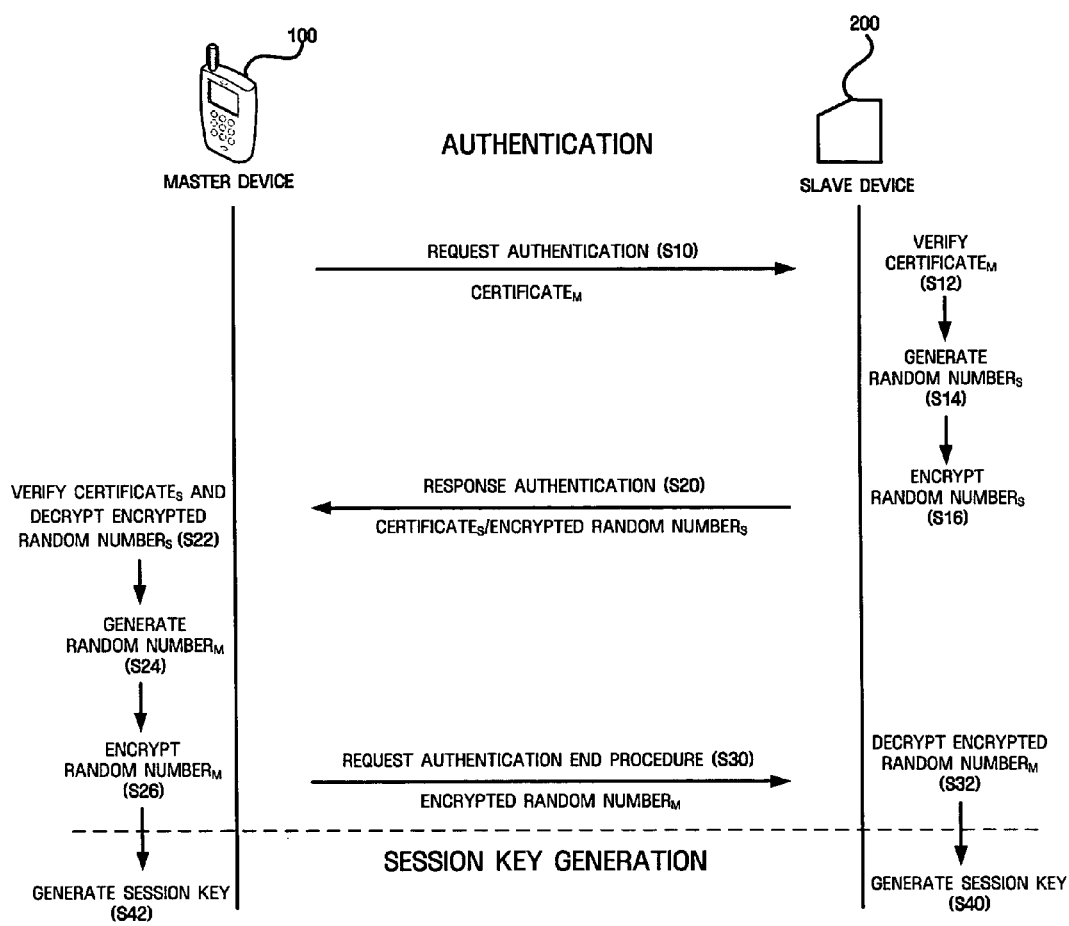
FIG. 3 is a flowchart illustrating authentication between a master device and a slave device according to an exemplary embodiment of the present invention.

FIG. 3 is a flowchart illustrating an authentication procedure according to an exemplary embodiment of the present invention.

In the illustrative embodiment, a subscript "M" of data indicates that the data is possessed or generated by a master device 100 and a subscript "S" of data indicates that the data is possessed or generated by a slave device 200.

In operation S10, the master device 100 sends an authentication request to the slave device 200. When requesting authentication, the master device 100 may send the slave device 200 a certificate$_M$, which was issued to the master device 100 by a certification authority. The certificate$_M$ is signed with a digital signature of the certification authority and contains a device ID$_M$ and the public key$_M$.

In operation S12, the slave device 200 verifies whether the certificate$_M$ of the master device 100 is valid using a certificate revocation list (CRL). If the certificate$_M$ is registered in the CRL, the slave device 200 may reject the authentication with the master device 100. If the certificate$_M$ is not registered in the CRL, the slave device 200 obtains the public key$_M$ using the certificate$_M$ of the master device 100.

If it is determined that the master device 100 is verified as an authenticated device, that is, the certificate$_M$ of the master device 100 is valid, in operation S14, the slave device 200 generates a random number$_S$. In operation S16, the generated random number$_S$ is encrypted using the public key$_M$.

In operation S20, the slave device 200 performs an authentication response procedure. During the authentication procedure, the slave device 200 sends a certificate$_S$, which was issued to the slave device 200 by the certification authority, and the encrypted random number$_S$. The certificates is signed with a digital signature of the certification authority and contains an ID$_S$ and public key$_S$ of the slave device 200.

In operation S22, the master device 100 receives the certificate$_S$ and encrypted random number$_S$ and authenticates the slave device 200 by verifying the certificate$_S$, and decrypts the encrypted random number$_S$ using its own private key$_M$. Here, the master device 100 obtains the public key$_S$ of the slave device 200 using the certificate$_S$ of the slave device 200. In addition, verification of the certificate$_S$ may also be performed on the slave device 200 using CRL.

If the slave device 200 is verified as an authenticated device using the certificate$_S$ of the slave device 200, in operation S24, the master device 100 generates a random number$_M$. In operation S26, the generated random number$_M$ is encrypted using the public key$_S$ of the slave device 200.

Thereafter, the master device 100 requests the slave device 200 for an authentication end procedure in operation S30.

When requesting for the authentication end procedure, the master device 100 sends the encrypted random number$_M$ to the slave device 200.

In operation S32, the slave device 200 receives the encrypted random number$_M$ and decrypts the random number$_M$ using its private key$_S$.

Accordingly, the master device 100 and the slave device 200 share each other's random numbers, that is, random number$_M$ and random number$_S$.

As a result, the master device 100 and the slave device 200 sharing each other's random numbers generate their session keys in operations S40 and S42. Here, in order for the master device 100 and the slave device 200 to generate their session keys, the same algorithm may be used. Therefore, the master device 100 and the slave device 200 share the same session key.

After authentication is completed, encrypting and decrypting the data to be transmitted between the master device 100 and the slave device 200 using their session keys can further provide for ensured security in data transmission. In several exemplary embodiments that are described below, unless otherwise noted, it is to be understood that the master device 100 and the slave device 200 encrypt and decrypt the data to be transmitted to each other using each session key generated by the authentication.

After completing the authentication procedure, the master device 100 may obtain one or more ROs having an inheritance structure from the slave device 200. The ROs having an inheritance structure may comprise a parent RO and a child RO. The master device 100 cannot play back a content object using only one of a parent RO and a child RO. In other words, the master device 100 needs both the parent RO and a child RO to play back a content object. In detail, the master device 100 can play back a content object identified by a content object identifier included in a child RO by using a content encryption key included in the child RO while referencing permission information and constraint information included in a parent RO. Therefore, the master device 100 may obtain one of a parent RO and a child RO or both of the parent RO and the child RO from the slave device 200 depending on whether the slave device 200 includes only one or both of the parent RO and the child RO. The obtaining of a parent RO and a child RO from the slave device 200 by the master device 100 will now be described in detail with reference to FIGS. 4 and 5.

Figure 4:
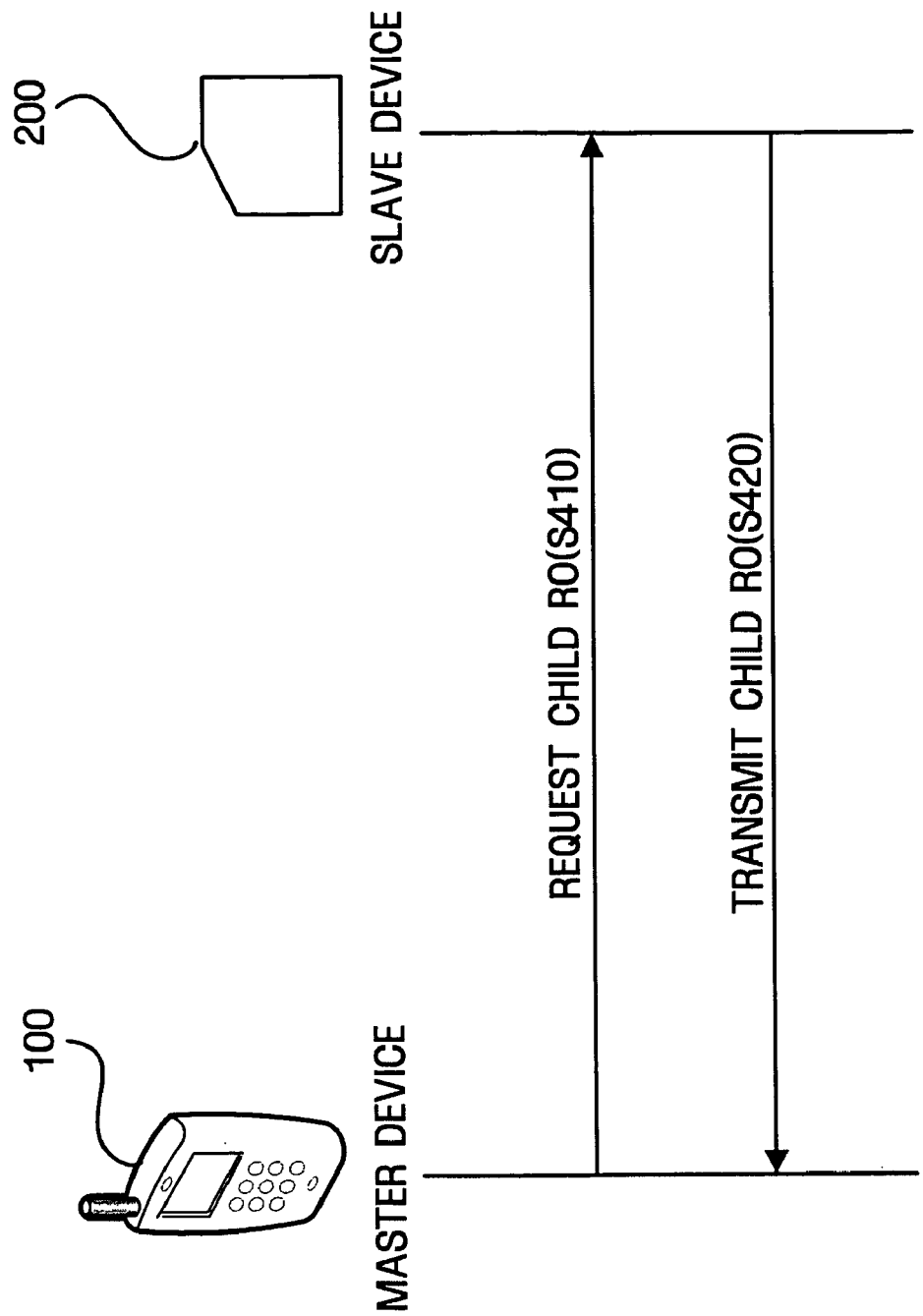
FIG. 4 is a flowchart illustrating a method of obtaining a child RO according to an exemplary embodiment of the present invention.

FIG. 4 is a flowchart illustrating a method of obtaining a child RO according to an exemplary embodiment of the present invention. Referring to FIG. 4, in operation S410, a master device 100 which wishes to play back a predetermined content object sends a request for a child RO to a slave device 200. In operation S420, the slave device transmits the requested child RO to the master device 100. In operation S420, the slave device may allow the master device 100 to access the requested child RO without directly transmitting the requested child RO to the master device 100. The master device 100 may transmit an identifier of the predetermined content object to the slave device 200 when sending the child RO request to the slave device 200. Then, the slave device 200 detects for, i.e., searches for, the requested child RO using the identifier of the predetermined content object.

FIG. 5 is a flowchart illustrating a method of obtaining a parent RO according to an exemplary embodiment of the present invention. Referring to FIG. 5, in operation S510, a master device 100 which wishes to play back a predetermined content object sends a request for a parent RO to a slave device 200. In operation S520, the slave device transmits the requested parent RO to the master device 100. In operation S520, the slave device may allow the master device 100 to access the requested parent RO without directly transmitting the requested parent RO to the master device 100. The master device 100 may transmit an inheritance relationship identifier specifying an inheritance relationship in which the requested RO is involved to the slave device 200 when sending the parent RO request to the slave device 200. Then, the slave device 200 searches for the requested parent RO using the inheritance relationship identifier.

As illustrated in FIGS. 4 and 5, the master device 100 may issue queries to the slave device 200 to obtain a child RO and a parent RO.

As described above, the master device 100 may store one or both of a parent RO and a child RO needed for playing back a content object, in which case, the master device 100 performs one or both of the method illustrated in FIG. 4 and the method illustrated in FIG. 5.

A parent RO according to an exemplary embodiment of the present invention and a child RO according to an exemplary embodiment of the present invention are illustrated in FIGS. 6 and 7, respectively.

FIG. 6 is a diagram of a parent RO according to an exemplary embodiment of the present invention which is expressed in a mark-up language. Referring to FIG. 6, the parent RO comprises permission information 620 and constraint information 630. A Play field 622 is set in the permission information 620, and the constraint information 630 comprises Datetime constraint information 632.

FIG. 7 is a diagram of a child RO according to an exemplary embodiment of the present invention which is expressed in a mark-up language. Referring to FIG. 7, the child RO comprises a content object identifier 730 and a content encryption key 720.

The parent RO illustrated in FIG. 6 comprises an inheritance relationship identifier 610 (SubscriptionGUID), and the child RO illustrated in FIG. 7 comprises an inheritance relationship identifier 710 (SubscriptionGUID). Since the inheritance relationship identifier 610 and the inheritance relationship identifier 710 are identical, it is determined that the parent RO illustrated in FIG. 6 and the child RO illustrated in FIG. 7 have an inheritance relationship with each other. If the master device 100 obtains both the parent RO illustrated in FIG. 6 and the child RO illustrated in FIG. 7 from the slave device 200, the master device 100 can play back a content object identified by the content object identifier 730 included in the child RO using the content encryption key 720 included in the child RO while referencing the permission information 620 and the constraint information 630 included in the parent RO.

The structures of the master device 100 and the slave device 200 will now be described in detail with reference to FIGS. 8 through 11.

Figure 8:
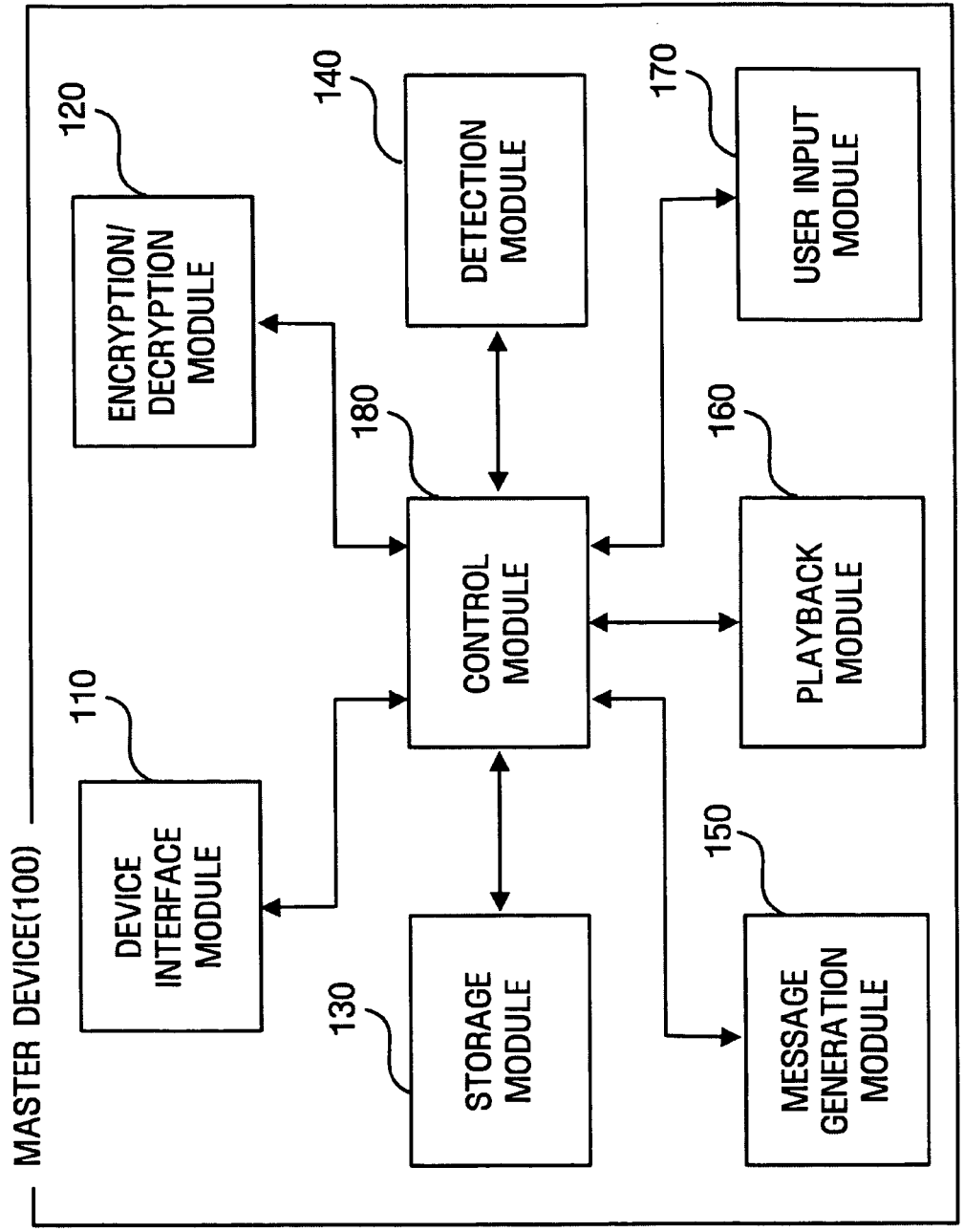
FIG. 8 is a block diagram of a master device according to an exemplary embodiment of the present invention.

FIG. 8 is a block diagram of a master device 100 according to an exemplary embodiment of the present invention. Referring to FIG. 8, the master device 100 comprises a device interface module 110, an encryption/decryption module 120, a storage module 130, a detection module 140, a message generation module 140, a playback module 160, a user input module 170, and a control module 180.

The device interface module 110 transmits data to or receives data from a slave device 200. The master device 100 may be connected to the slave device 200 via the device interface module 110.

The encryption/decryption module 120 performs encryption/decryption on data. In detail, the encryption/decryption module 120 encrypts data to be transmitted to the slave device 200 or decrypts data received from the slave device 200 upon the request of the control module 180. The encryption/decryption module 120 may be able to perform not only a public key-based encryption method but also a private key-based encryption method. For this, one or more encryption/decryption modules 120 may be included in the master device 100.

The encryption/decryption module 120 may generate random numbers needed for performing authentication between the master device 100 and the slave device 200.

The storage module 130 stores content objects, parent ROs, child ROs, a CRL, and a certificate of the master device 100. For this, the storage module 130 may comprise a storage medium such as a hard disc or a flash memory.

The detection module 140 searches the storage module 130 for a child RO and a parent RO needed for playing back a content object.

The message generation module 150 generates a child RO request message and a parent RO request message. The child RO request message may comprise a content object identifier, and the parent RO request message may comprise an inheritance relationship identifier. The message generation module 150 may generate the child RO request message and the parent RO request message when the detection module 140 fails to discover a child RO and a parent RO needed for playing back a content object from the storage unit 130.

The playback module 160 plays back a content object using a child RO and a parent RO. For example, the playback module 160 may comprise a moving picture decoding module, in which case, the playback module 160 can play back a content object comprising MPEG-compressed moving picture data.

The user input module 170 receives a command or request from a user. For this, the user input module 170 may comprise an input unit such as a keypad, a touch pad, or a touch screen.

The control module 180 controls the device interface module 110, the encryption/decryption module 120, the storage module 130, the detection module 140, the message generation module 150, the playback module 160, and the user input module 170. Therefore, the control module 180 may serve as a DRM agent that generally manages a DRM operation performed by the master device 100. In addition, as described above with reference to FIG. 3, the control module 180 may control authentication between the master device 100 and the slave device 200 when the master device 100 is connected to the slave device 200.

Figure 9:
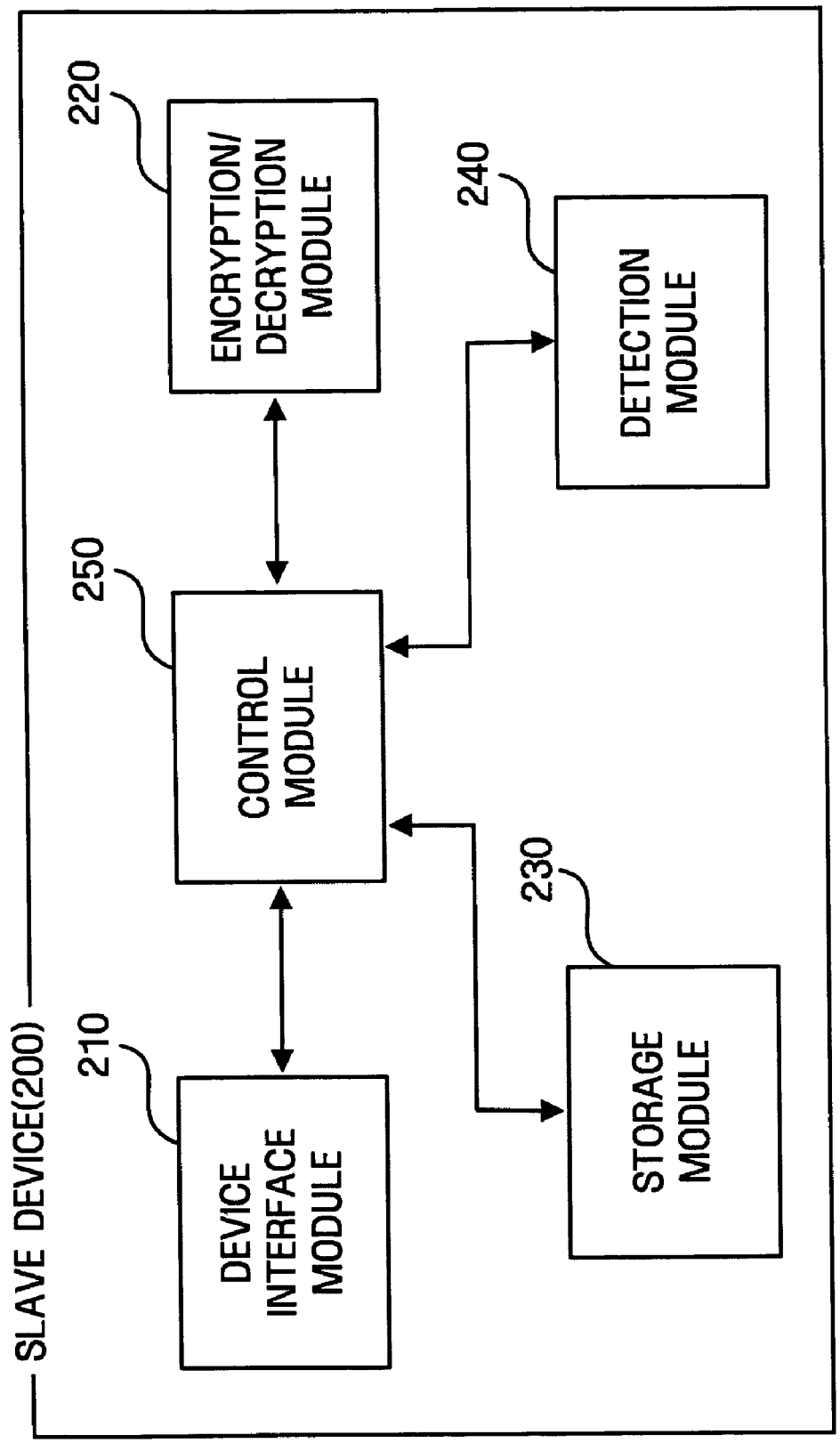
FIG. 9 is a block diagram of a slave device according to an exemplary embodiment of the present invention.

FIG. 9 is a block diagram of a slave device 200 according to an exemplary embodiment of the present invention. Referring to FIG. 9, the slave device 200 comprises a device interface module 210, an encryption/decryption module 220, a storage module 230, a detection module 240, and a control module 250.

The device interface module 210 transmits data to or receives data from a master device 100. The slave device 200 can be connected to the master device 100 via the device interface module 210.

The encryption/decryption module 220 performs encryption/decryption on data. In detail, the encryption/decryption module 220 encrypts data to be transmitted to the master device 100 or decrypts data received from the master device 100 upon the request of the control module 250. The encryption/decryption module 220 may be able to perform not only a public key-based encryption method but also a private key-based encryption method. For this, one or more encryption/decryption modules 220 may be included in the slave device 200.

The encryption/decryption module 220 may generate random numbers needed for performing authentication between the master device 100 and the slave device 200.

The storage module 230 stores content objects, parent ROs, child ROs, a CRL, and a certificate of the slave device 200. For this, the storage module 230 may comprise a storage medium such as a hard disc or a flash memory. The parent ROs and the child ROs stored in the storage module 230 may be moved from or copied from the master device 100 or may be those which were provided to the slave device 200 when the slave device 200 was manufactured.

The detection module 240 searches the storage module 230 for a child RO or a parent RO when a child RO request message or a parent RO request message is received from the master device 100.

The control module 250 controls the device interface module 210, the encryption/decryption module 220, the storage module 230, and the detection module 240. Therefore, the control module 250 may serve as a DRM agent that generally manages a DRM operation performed by the slave device 200. In addition, as described above with reference to FIG. 3, the control module 250 may control authentication between the master device 100 and the slave device 200 when the slave device 200 is connected to the master device 100.

In FIGS. 8 and 9, the term "module" means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

The operations of the master device 100 and the slave device 200 will now be described in further detail with reference to FIGS. 10 and 11.

Figure 10:
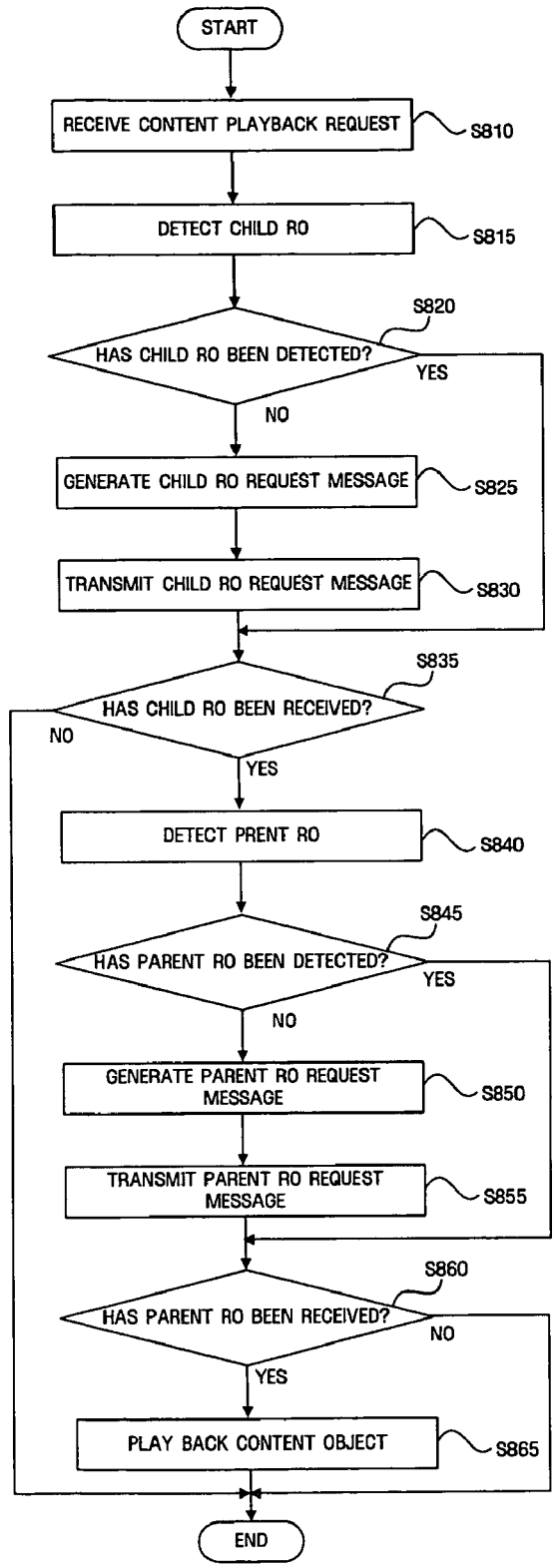
FIG. 10 is a flowchart illustrating a method of consuming ROs having an inheritance structure according to an exemplary embodiment of the present invention.

FIG. 10 is a flowchart illustrating a method of consuming ROs according to an exemplary embodiment of the present invention. Referring to FIG. 10, the method is performed by a master device 100. In operation S810, the master device 100 receives a request for a content object from a user via a user input module 170. In operation S815, a detection module 140 searches a storage module 130 for a predetermined child RO containing a content encryption key needed for playing back the requested content object. In detail, the detection module 140 may obtain a content object identifier from the requested content object and searches for the predetermined child RO with reference to the content object identifier. Child ROs stored in the storage module 130, like the child RO illustrated in FIG. 7, comprise a content object identifier 730. Therefore, the detection module 140 examines the content object identifiers of the child ROs stored therein and searches for a child RO whose content object identifier is identical to the content object identifier obtained from the requested content object.

In operation S820, if the predetermined child RO is not detected from, i.e., found in, the storage module 130, the master device 100 sends a request for the predetermined child RO to a slave device 200. For this, in operation S825, a message generation module 150 generates a child RO request message, and in operation S830, the device interface module 110 transmits the child RO request message to the slave device 200. The child RO request message may comprise a content object identifier.

In operation S835, the device interface module 110 receives the predetermined child RO from the slave device 200, and then, a process of obtaining a parent RO is performed. However, if no child RO is received from the slave device 200 (for example, if the predetermined child RO is not received within a predetermined amount of time or if a message indicating that the predetermined child RO has not yet been detected from the slave device 200 is received), the method is terminated because the master device 100 cannot play back the requested content object.

In operation S840, if the predetermined child RO is detected from the storage module 130 or is received from the slave device 200, the detection module 140 searches the storage module 130 for a parent RO that has an inheritance relationship with the predetermined child RO. For this, the detection module 140 may obtain an inheritance relationship identifier from the predetermined child RO and searches the storage module 130 for a parent RO whose inheritance relationship identifier is identical to the obtained inheritance relationship identifier.

If the parent RO having an inheritance relationship with the predetermined child RO is not detected from the storage module 130 in operation S845, a process of sending a request for the parent RO having an inheritance relationship with the predetermined child RO to the slave device 200 is performed. For this, in operation S850, the message generation module 150 generates a parent RO request message, and in operation S855, the device interface module 110 transmits the parent RO request message to the slave device 200. The parent RO request message may comprise an inheritance relationship identifier.

Thereafter, if no parent RO is received from the slave device 200 (for example, if the parent RO having an inheritance relationship with the predetermined child RO is not received within a predetermined amount of time or if a message indicating that the parent RO having an inheritance relationship with the predetermined child RO has not yet been detected from the slave device 200 is received), the method is terminated because the master device 100 cannot play back the requested content object.

In operation S865, if the predetermined child RO is detected from the storage module 130 or is received from the slave device 200, a playback module 160 plays back the requested content object using the predetermined child RO and the parent RO having an inheritance relationship with the predetermined child RO.

As described above with reference to FIG. 10, the master device 100 may issue a request for a child RO and a request for a parent RO having an inheritance relationship with the child RO separately to the slave device 200.

Figure 11:
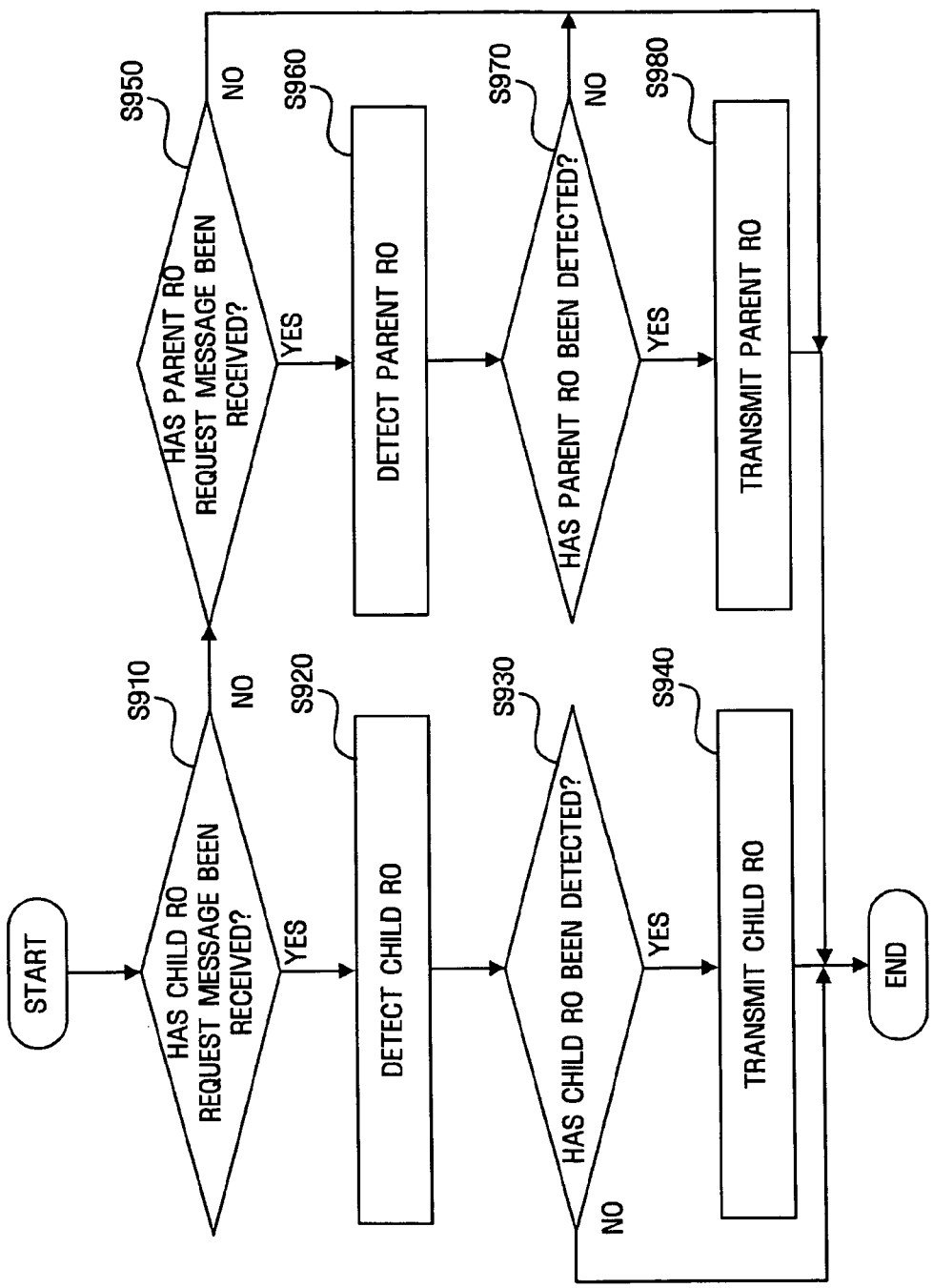
FIG. 11 is a flowchart illustrating the providing of ROs by a slave device according to an exemplary embodiment of the present invention.

FIG. 11 is a flowchart illustrating the providing of ROs to a master device 100 by a slave device 200 according to an exemplary embodiment of the present invention.

Referring to FIG. 11, in operation S910, a device interface module 210 receives a request for a child RO from the master device 100. In operation S920, a detection module 240 searches a storage module 230 for a child RO requested by the master device 100. In detail, the detection module 240 may obtain a content object identifier from the child RO request message and searches the storage module 230 for a child RO whose content object identifier is identical to the obtained content object identifier.

In operation S940, if the requested child RO is detected from the storage module 230 in operation S930, the device interface module 210 transmits the detected child RO to the master device 100.

In operation S950, the device interface module 210 receives a parent RO request message from the mater device 100. In operation S960, the detection module 240 searches the storage module 230 for a parent RO requested by the master device 100. In detail, the detection module 24 may obtain an inheritance relationship identifier from the parent RO request message and searches the storage module 230 for a parent RO whose inheritance relationship identifier is identical to the obtained inheritance relationship identifier.

If the requested parent RO is detected from the storage module 230 in operation S970, the device interface module 210 transmits the detected parent RO to the master device 100 in operation S980.

Operations S940 and S950 have been described above as being operations in which the slave device 200 actively transmits the requested child RO and the requested parent RO to the master device 100, but the present invention is not restricted to it. For example, a control module 250 of the slave device 200 may allow the master device 100 to access the requested child RO and the requested parent RO.

As described above, all the queries for obtaining a content object identifier from a content object to detect a child RO, for obtaining an inheritance relationship identifier from the child RO to search for a parent RO, and for obtaining the child RO and the parent RO from the slave device 200 are sent by the master device 100. Therefore, in a case where the master device 100 plays back a content object using a plurality of ROs that are stored in the slave device 200 and have an inheritance structure, the slave device 200 can detect the ROs by performing a minimum number of processes. Therefore, it is possible to considerably reduce the operation load of the slave device 200.

As described above, the method and the device for consuming a plurality of ROs having an inheritance structure in an environment where the ROs are distributed over a plurality of devices have the following aspects.

First, even in an environment where a content object and a parent RO and a child RO needed for playing back the content object are stored in different devices, it is possible to play back the content object using an inheritance relationship between the parent RO and the child RO.

Second, even when a plurality of ROs having an inheritance structure are stored in a slave device which has poorer operation capabilities than a master device, it is possible to facilitate the consumption of the ROs using the operation capabilities of the master device.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described exemplary embodiments have been provided only in a descriptive sense and will not be construed as placing any limitation on the scope of the invention.

What is claimed is:

1. A master device including a non-transitory computer readable medium including modules, the modules comprising:

a storage module configured to store a plurality of rights objects (ROs) having a plurality of inheritance structures, the plurality of ROs including parent ROs and child ROs;

a detection module programmed to perform a first search of the storage module for a child RO corresponding to a predetermined content object;

a message generation module programmed to generate a first RO request message for the child RO when the detection module fails to discover the child RO corresponding to the predetermined content object from the storage module;

a device interface module configured to transmit the first RO request message to a slave device and receive the child RO corresponding to the predetermined content object from the slave device;

the detection module being further programmed to perform a second search of the storage module for a parent RO corresponding to the predetermined content object, wherein the child RO includes an identifier for identifying the parent RO;

the message generation module further programmed to generate a second RO request message for the parent RO when the detection module fails to discover the parent RO from the storage module;

the device interface module further configured to transmit the second RO request message to the slave device and receive the parent RO from the slave device; and a playback module programmed to play back the predetermined content object using the child RO received from one of the storage module and the slave device and the parent RO received from one of the storage module and the slave device.

2. The master device of claim 1, wherein the child RO comprises at least one of an identifier of the predetermined content object, a content encryption key corresponding to the predetermined content object, and constraint information regarding use restriction of the child RO, and wherein the parent RO comprises at least one of the constraint information and permission information regarding playback methods for playing back the predetermined content, the playback methods being obtainable from the child RO.

3. The master device of claim 2, wherein the master device is programmed to not search for the parent RO when it is determined that the child RO is neither stored in the storage module nor stored in the slave device.

4. The master device of claim 1, wherein the first RO request message comprises a first identifier of the predetermined content object, the detection module is programmed to detect the child RO from the slave device with reference to the first identifier of the predetermined content object, and the detection module is programmed to search for the parent RO using an inheritance relationship identifier included in the child RO.

5. The master device of claim 1, wherein the master device is prohibited from playing back the predetermined content object without using the child RO and the parent RO.

6. The master device of claim 5, wherein the first RO request message comprises a first identifier of the predetermined content object, the second RO request message comprises an inheritance relationship identifier included in the child RO, the child RO is detected from the slave device with reference to the first identifier of the predetermined content object, and the first parent RO is detected from the slave device using the inheritance relationship identifier.

7. The master device of claim 1, wherein the master device is one of a desktop computer, a laptop computer, a mobile phone, a personal digital assistant, or a content player device, and the slave device is a storage device including a memory.

8. The master device of claim 7, wherein the slave device is a memory card.

9. The master device of claim 1, wherein the slave device is a portable storage device.

10. A method of consuming a plurality of Rights Objects (ROs), the method comprising:

obtaining a plurality of ROs having predetermined inheritance structures from a slave device; and playing back a predetermined content object at a master device using at least two of the plurality of ROs, wherein the plurality of ROs comprises at least a first child RO and a first parent RO, the first child RO having a first inheritance relationship with the first parent RO and the first parent RO having a second inheritance relationship with the first child RO, wherein the first child RO comprises at least one of an identifier of the predetermined content object, a content encryption key corresponding to the predetermined content object, and constraint information regarding use restriction of the first child RO, wherein the first parent RO comprises at least one of the constraint information and permission information regarding playback methods for playing back the predetermined content, the playback methods being obtainable from the first child RO, and wherein the obtaining comprises:

sending a request for the first child RO to the slave device;

sending a separate request for the first parent RO to the slave device; and receiving the first child RO from the slave device and receiving the first parent RO from the slave device; and wherein the playing back comprises playing back the predetermined content object using the first child RO and the first parent RO.

11. The method of claim 10, wherein the sending the request for the first child RO comprises transmitting an identifier of the predetermined content object to the slave device, and the first child RO is detected from the slave device with reference to the identifier of the predetermined content object.

12. The method of claim 10, further comprising:

prior to sending the request for the first child RO to the slave device, searching on the master device for the first child RO.

13. The method of claim 12, wherein the sending the separate request for the parent RO comprises:

obtaining an inheritance relationship identifier from the first child RO, the inheritance relationship identifier identifying the first parent RO; and transmitting the inheritance relationship identifier to the slave device, the first parent RO being detected from the slave device using the inheritance relationship identifier.

14. The method of claim 10, further comprising, prior to sending the separate request for the first parent RO to the slave device, searching on the master device for the first child RO.

15. The method of claim 14, wherein the sending the separate request for the parent RO comprises:

obtaining an inheritance relationship identifier identifying the first parent RO from the first child RO; and transmitting the inheritance relationship identifier to the slave device, and the first parent RO being detected from the slave device using the inheritance relationship identifier.

16. The method of claim 10, wherein the slave device is a portable storage device.

17. The method of claim 14, further comprising:
detecting that the first child RO is stored in one of the master device and the slave device, and after the detecting, sending the separate request for the first parent RO to the slave device.

18. The method of claim 10, further comprising:
prohibiting the master device from playing back the predetermined content without using the first parent RO and the first child RO.

19. The master device including a non-transitory computer readable medium programmed to perform the steps of:
obtaining a plurality of rights objects (ROs) having predetermined inheritance structures from a slave device; and
playing back a content object using at least two of the plurality of ROs, wherein the plurality of ROs comprises at least a first child RO and a first parent RO, the first child RO having a first inheritance relationship with the first parent RO and the first parent RO having a second inheritance relationship with the first child RO,
wherein the first child RO comprises at least one of an identifier of the content object, a content encryption key corresponding to the content object, and constraint information regarding use restriction of the first child RO,
wherein the first parent RO comprises at least one of the constraint information and permission information regarding playback methods for playing back the content, the playback methods being obtainable from the first child RO, and
wherein the obtaining comprises:
sending a request for the first child RO to the slave device;
sending a separate request for the first parent RO to the slave device; and
receiving the first child RO from the slave device and receiving the first parent RO from the slave device, and
wherein the playing back comprises playing back the content object using the first child RO and the first parent RO.

20. The method of claim 19, wherein the master device is one of a desktop computer, a laptop computer, a mobile phone, a personal digital assistant, or a content player device.

\* \* \* \* \*